United States Patent [19]
Muller

[11] 3,841,679
[45] Oct. 15, 1974

[54] RESILIENT BUMPER ASSEMBLY
[75] Inventor: George H. Muller, Ann Arbor, Mich.
[73] Assignee: Ford Motor Company, Dearborn, Mich.
[22] Filed: Mar. 13, 1972
[21] Appl. No.: 233,985

[52] U.S. Cl................. 293/63, 52/100, 52/716, 293/1, 293/71 R, 293/98
[51] Int. Cl...... B60r 19/08, E04c 2/44, E04f 19/02
[58] Field of Search............ 114/219; 293/63, 71 R, 293/98, 99; 52/100, 716

[56] References Cited
UNITED STATES PATENTS

| | | | |
|---|---|---|---|
| 1,673,692 | 6/1928 | Marston | 293/71 R |
| 2,531,967 | 11/1950 | Bishop | 293/71 R |
| 2,734,765 | 2/1956 | Henderson et al. | 293/62 |
| 2,749,171 | 6/1956 | Fergueson | 293/71 R |
| 2,959,146 | 11/1960 | Erkert | 293/71 R X |
| 3,065,724 | 11/1962 | Tritt | 114/219 X |
| 3,290,082 | 12/1966 | Fritsch | 293/1 |
| 3,359,030 | 12/1967 | Newman | 293/1 |
| 3,441,305 | 4/1969 | Trammell, Jr. | 293/71 R X |
| 3,471,979 | 10/1969 | Herr | 52/100 |
| 3,606,432 | 9/1971 | Honatzis | 293/1 |
| 3,606,434 | 9/1971 | Barton et al. | 293/71 R X |
| 3,638,985 | 2/1972 | Barton et al. | 293/71 R |

Primary Examiner—M. Henson Wood, Jr.
Assistant Examiner—Howard Beltran
Attorney, Agent, or Firm—Keith L. Zerschling; Roger E. Erickson

[57] ABSTRACT

Retaining means for mounting a flexible trim strip in a resilient bumper assembly suitable for use on an automotive vehicle. The means includes a track in which the flexible trim strip is received. The track is undercut at its ends and sides to form lip means that conceal the ends and edges of the trim strip. The length of the flexible trim strip may be somewhat shorter than the length of the track to provide end clearance for the trim strip enabling longitudinal displacement of the trim strip relative to the track during deformation of the bumper assembly. The back of the track may be ribbed or corrugated to achieve a substantial reduction in friction between the trim strip and the track surfaces.

6 Claims, 8 Drawing Figures

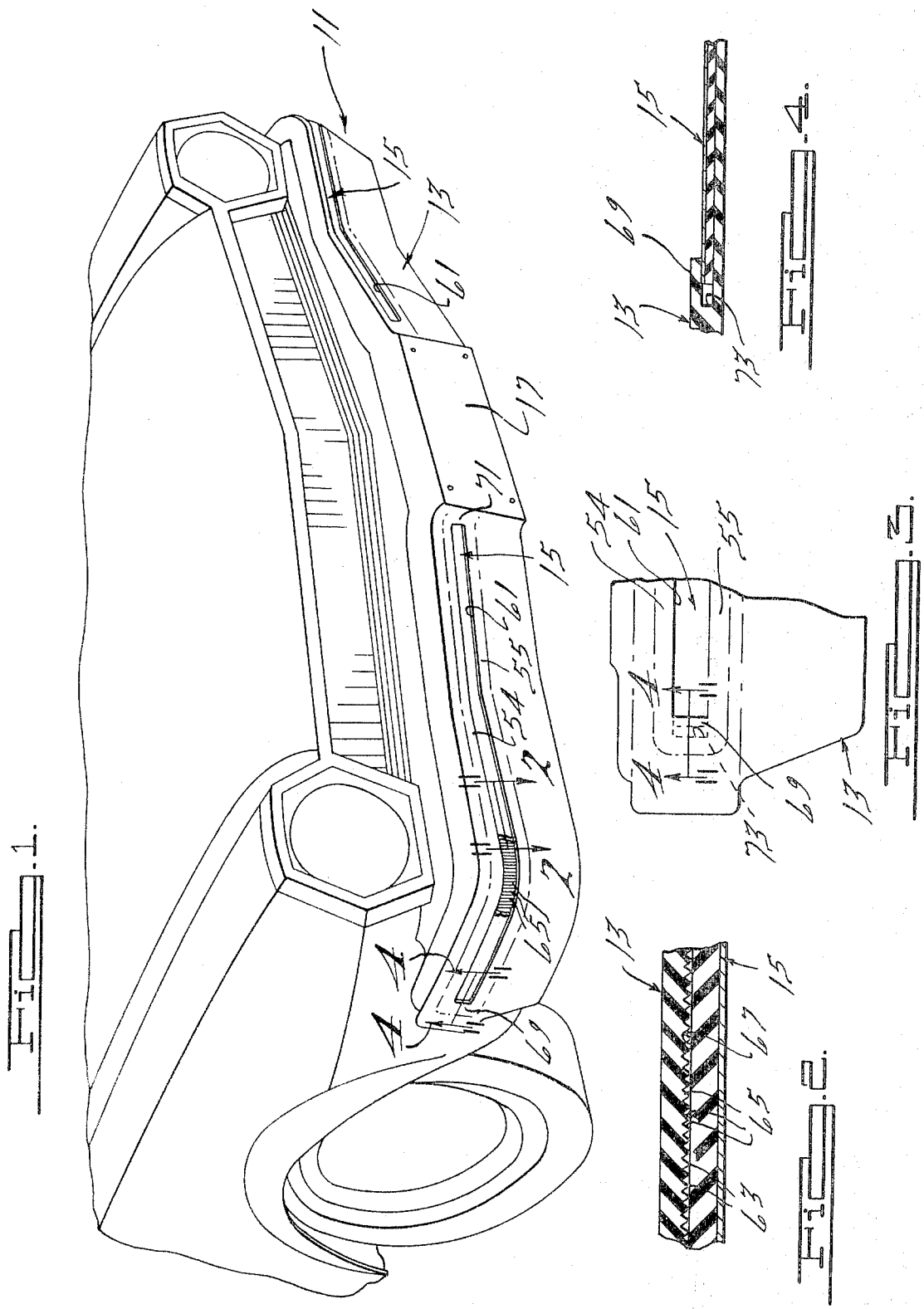

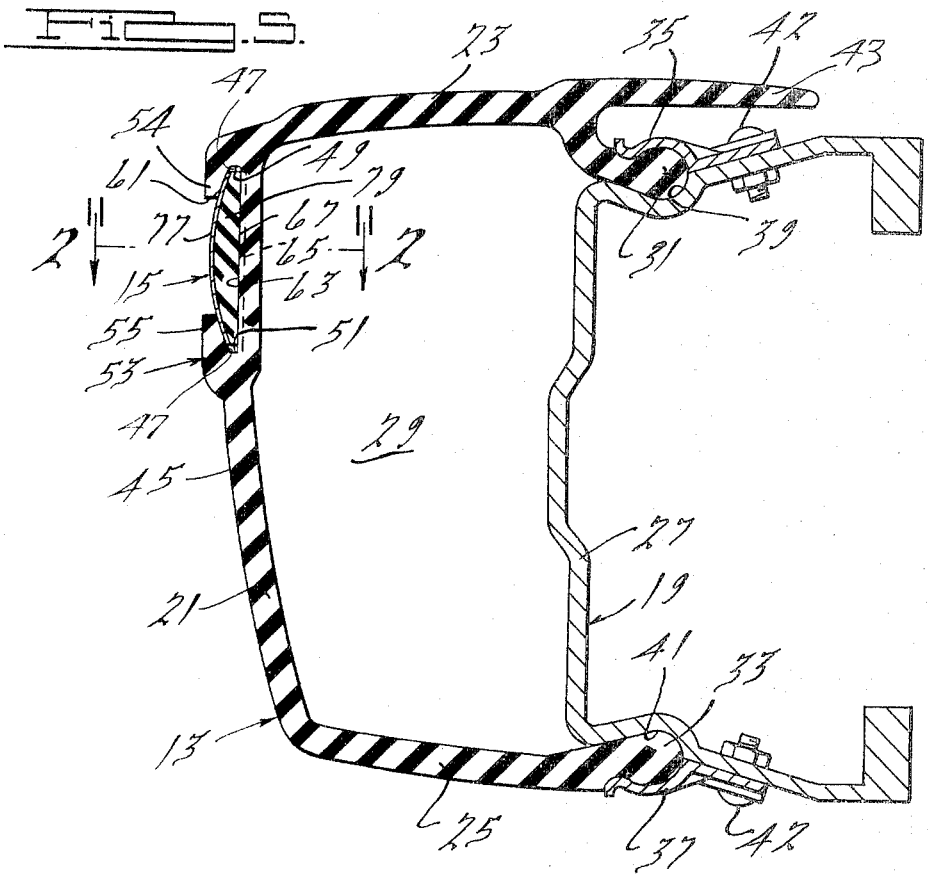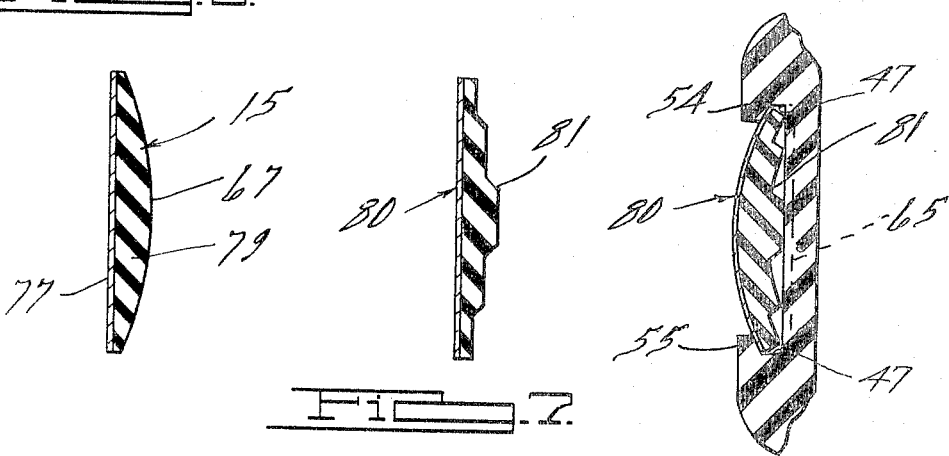

RESILIENT BUMPER ASSEMBLY

BACKGROUND AND SUMMARY OF THE INVENTION

Various resiliently deformable automobile bumper structures that yield on impact to prevent or reduce damage are known in the art. Many of these bumpers are effective in reducing impact damage to the automobile but aesthetically are less than attractive. This invention is directed to improving the appearance of resiliently deformable bumper member, either a pneumatic or solid type, with a bright trim strip. More particularly, this invention provides means for retaining a trim strip to a deformable bumper member which will maintain its retention during impact to the bumper. In addition, the invention provides a construction in which the flexible trim strip may be displaced relative to the deformable bumper remains to fully accommodate impact deformation. Furthermore, the invention provides a construction to retain a trim strip which requires no adhesives or mechanical fasteners. Finally, the invention provides a trim strip retention means which is economical to produce and provides ease of assembly and service.

Means for retaining a flexible strip to a resiliently deformable member, such as an automobile bumper, constructed in accordance with this invention include a longitudinally extending track formed in the resiliently deformable member having a pair of substantially parallel longitudinally extending side edges, a pair of longitudinally separated ends determining the length of the track. A set of lips is formed in the resiliently deformable member and overlaps and envelops the side edges and ends of the track. The inner periphery of the set of lips defines a longitudinally extending opening to the track. The flexible strip is positioned between the side edges of the track and is retained in position against the back or base of the track by the lip portions of the resiliently deformable member. A portion of the front face of the flexible strip is exposed and visible through the opening. The front face may be fabricated of bright metal or other material to provide an attractive highlight to the bumper assembly.

BRIEF DESCRIPTION OF THE DRAWINGS

FIG. 1 of the drawings is a perspective view of a front portion of an automotive vehicle showing a resiliently deformable bumper assembly incorporating this invention;

FIG. 2 of the drawings is a cross sectional view taken along line 2—2 of FIG. 1;

FIG. 3 of the drawings is an enlarged elevational view of an end portion of the trim strip retaining means;

FIG. 4 of the drawings is a cross sectional view taken along line 4—4 shown in FIGS. 1 and 3;

FIG. 5 is a transverse cross sectional view of a resiliently deformable bumper assembly including the installed flexible trim strip;

FIG. 6 is a transverse cross sectional view of the flexible trim strip shown in FIG. 4 in its uninstalled, free state;

FIG. 7 is a transverse cross sectional view of an alternate embodiment of a flexible trim strip in its uninstalled, free state;

FIG. 8 is a transverse cross sectional view of a portion of a resiliently deformable bumper assembly having installed the flexible trim strip of FIG. 7.

DETAILED DESCRIPTION OF THE PREFERRED EMBODIMENT

FIG. 1 of the drawings illustrates a front portion of an automotive vehicle employing a bumper assembly 11 constructed in accordance with this invention. The bumper shell 13 is constructed of a resiliently deformable material such as urethane or ethylene propylene diene monomer (EPDM). A bright trim strip 15 is mounted on the bumper shell and provides a longitudinally extending highlight to the bumper assembly. A mounting pad 17 for a license plate is centrally located on the resiliently deformable shell.

FIG. 5 of the drawings is a transverse cross sectional view of the bumper assembly 11 taken through a portion that includes the trim strip 15. In addition to the trim strip 15 and the resiliently deformable bumper member or outer shell 13, the complete bumper assembly includes a backing member 19 onto which the resiliently deformable member or shell 13 is attached. The backing member is attached to frame or body structural members of the automotive vehicle in a conventional manner (not shown).

The resiliently deformable member or outer shell 13 includes a front wall 21, a top sidewall 23, and a bottom sidewall 25. These three walls together with the front portion 27 of the backing member 19 form a pneumatic chamber 29 which may be precharged with air pressure or which can accommodate a pressure buildup during impact. The top sidewall 23 and bottom sidewall 25 terminate at beads 31 and 33, respectively. The beads cooperate with clamps 35 and 37 and contoured portions 39 and 41 of the backing member to securely retain the resiliently deformable member 13 to the backing member 19. The clamps are fastened to the backing member by bolts 42. A flap 43 extends over top bead 31 and clamp 35 to hide the clamp and bolts from view and to present a finished, continuous appearance to the top of the resiliently deformable member.

The front face 45 of the resiliently deformable member or outer shell 13 includes a pair of tracks 47 which position and retain the flexible trim strip 15. Each track includes a pair of longitudinally extending generally parallel side edges 49 and 51. Lip means 53, including upper and lower portions 54 and 55, are integrally formed with the remainder of the resiliently deformably outer shell and overlap and envelop the track side edges 49 and 51. The inner peripheral edges of the lips 54 and 55 are substantially parallel and form the upper and lower edges of a horizontally extending opening 61 through which the flexible trim strip 15 is inserted and visible. The base or back 63 of the track has a friction reducing surface formation 65, which in the preferred embodiment comprises vertically disposed corrugations. It should be understood that any type of friction reducing formation is acceptable such as horizontally disposed corrugations or ribs or a plurality of conical or spherical protrusions. These friction reducing formations engage the back side 67 of the trim strip 15 and facilitate its movement relative to the track 47 during impact or during insertion. The lip means 53 includes end portions 69 and 71 which overlap longitudinal ends of the track. One of the ends is identified in FIGS. 3 and 4 by reference numeral 73. The length of the track 47 from end to end is greater than the length of the trim strip 15 providing clearance to permit longitudinal displacement of the trim strip relative to the track. If a tight pneumatic seal is not necessary, the ends of the track 47 could open into the chamber 29 rather than being closed as shown in FIG. 4.

The flexible trim strip 15 is shown installed in the resiliently deformable outer shell member 13 in FIG. 5 and is shown in its free or uninstalled condition in FIG. 6. The trim strip has a thin facing 77 of a bright material, such as polished stainless steel. The strip backing 79 is a flexible polymeric material to which the bright facing 77 is bonded. To provide an attractive highlight, it is desirable to have a convex surface as the visible surface of the trim strip. The convex face is achieved by varying the thickness of the backing member 79 rather than using pre-curved or pre-crowned thin metal material which tends to buckle rather than flatten when struck. The maximum thickness of the trim strip occurs at approximately its midpoint and a minimum thickness occurs at the upper and lower edges. When installed within the groove, as shown in FIG. 6, the track lips 54 and 55 pull the upper and lower edges of the strip toward the base 63 of the track and impart a crowned frontal surface to the metal layer.

FIGS. 7 and 8 show an alternate construction for the flexible trim strip 80 having a stepped back 81 rather than a continuously curved back. Other back configurations having a maximum dimension through the midpoint of its width and a minimum thickness at the upper and lower side edges also would be suitable.

Modifications and alterations will occur to those skilled in the art which are included within the scope of the following claims:

I claim:

1. Means for retaining a flexible trim strip within a resiliently deformable bumper member,
   a longitudinally extending track formed in an impact receiving side of said bumper member,
   said track having a pair of substantially parallel longitudinally extending side edges and a pair of longitudinally separated ends determining the length of said track,
   said bumper member including lip means overlapping and enveloping the side edges and ends of said track,
   the inner periphery of said lip means defining a longitudinally extending opening to said track,
   said flexible trim strip being positioned between the side edges of said track and retained in position by said lip means,
   portions of said flexible strip being covered by said lip means, a remaining portion of said trim strip being exposed and visible through said opening,
   friction reducing means formed on the back of said track means between said side edges,
   said flexible trim strip being longitudinally displaceable within said track upon deformation of said bumper member.

2. Means according to claim 1,
   said friction reducing means including a nonplanar surface on the back of said track between the longitudinally extending side edges thereof, said surface including a plurality of relatively protruding and recessed portions,
   the backside of said flexible trim strip engaging substantially only the protruding portions of said track back surface.

3. Means according to claim 1,
   the length of said flexible trim strip being less than the length of said track receiving the trim strip to permit relative longitudinally directed movement between the trim strip and the track under impact conditions.

4. Means for retaining a flexible strip to a resiliently deformable member comprising
   a longitudinally extending track formed in said resilient member having a pair of longitudinally extending parallel side edges,
   said track having a longitudinally extending back between said pair of track side edges,
   said back having non-planar surface formations including a plurality of relatively protruding and relatively recessed portions,
   a pair of longitudinally extending lips positioned adjacent said edges, respectively, overlapping and enveloping said edges,
   said lips being spaced to form a longitudinally extending opening to said track,
   said flexible strip being received within said track, said lips overlying and concealing the side edge portions of said strip,
   the backside of said flexible strip engaging substantially only the protruding portions of said track back surface.

5. Means for retaining a flexible strip to a resiliently deformable member comprising
   a longitudinally extending track formed in said resilient member having a pair of longitudinally extending parallel side edges,
   said track having a longitudinally extending back between said pair of track edges said back having a corrugated surface,
   a pair of longitudinally extending lips positioned adjacent said edges, respectively, overlapping and enveloping said edges,
   said lips being spaced to form a longitudinally extending opening to said track,
   said flexible strip being received within said track, said lips overlying and concealing the side edge portions of said strip,
   the backside of said trim strip engaging the apices of said corrugated surface.

6. Means for retaining a flexible strip to a resiliently deformable member comprising
   a longitudinally extending track formed in said resilient member having a pair of substantially parallel longitudinally extending side edges and a pair of longitudinally separated ends determining the length of said track,
   lip means overlapping and enveloping the side edges and ends of said track,
   the inner periphery of said lip means defining a longitudinally extending opening to said track,
   said flexible strip being positioned between the side edges of said track and retained in position by said lip means,
   a portion of said flexible strip being exposed through said opening,
   said track having a longitudinally extending back between said pair of track side edges,
   said back having a non-planar surface including a plurality of relatively protruding and relatively recessed portions,
   said flexible strip having a back engaging substantially only the protruding portions of said track back surface.

* * * * *